United States Patent
Kinthada Venkata et al.

(10) Patent No.: US 9,877,257 B2
(45) Date of Patent: Jan. 23, 2018

(54) PERFORMANCE IMPROVEMENTS FOR HIGH GAIN DEVICES

(71) Applicant: QUALCOMM Incorporated, San Diego, CA (US)

(72) Inventors: Madhusudan Kinthada Venkata, San Diego, CA (US); Arvind Santhanam, San Diego, CA (US); Manjinder Sandhu, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/150,346

(22) Filed: May 9, 2016

(65) Prior Publication Data

US 2016/0373995 A1   Dec. 22, 2016

Related U.S. Application Data

(60) Provisional application No. 62/182,825, filed on Jun. 22, 2015.

(51) Int. Cl.
| | |
|---|---|
| H04W 36/36 | (2009.01) |
| H04B 17/318 | (2015.01) |
| H04B 17/373 | (2015.01) |
| H04J 11/00 | (2006.01) |
| H04L 5/00 | (2006.01) |

(Continued)

(52) U.S. Cl.
CPC .......... *H04W 36/36* (2013.01); *H04B 17/318* (2015.01); *H04B 17/373* (2015.01); *H04J 11/00* (2013.01); *H04L 5/005* (2013.01); *H04W 36/0083* (2013.01); *H04W 36/30* (2013.01);

(Continued)

(58) Field of Classification Search
CPC . H04W 36/22; H04W 36/04; H04W 36/0055; H04W 36/0061; H04W 36/0094; H04W 36/30; H04W 36/38; H04W 36/0083; H04W 36/02; H04W 36/32
See application file for complete search history.

(56) References Cited

U.S. PATENT DOCUMENTS 8,520,617 B2   8/2013   Krishnamurthy et al.
9,203,574 B2   12/2015  Johansson et al.
(Continued)

FOREIGN PATENT DOCUMENTS

WO   WO-2011/057037 A2   5/2011
WO   WO-2014/142725 A1   9/2014

OTHER PUBLICATIONS

ISA/EP, International Search Report and Written Opinion of the International Searching Authority, Int'l Application No. PCT/US2016/031639, dated Aug. 31, 2016, European Patent Office, Rijswijk, NL, 14 pgs.

*Primary Examiner* — Diane Mizrahi
(74) *Attorney, Agent, or Firm* — Holland & Hart LLP

(57) ABSTRACT

Wireless communication is disclosed using a wireless communication device, such as a user equipment (UE) having a high-gain antenna. In a cell that uses at least one of reference signal received power (RSRP)-based cell selection or RSRP-based cell reselection, the wireless communication device may determine an offset RSRP by applying an offset to a measured RSRP if a signal quality of communications from a serving base station of the cell fails to satisfy a signal quality threshold. The UE may initiate at least one of a cell selection or cell reselection operation based on the offset RSRP.

30 Claims, 11 Drawing Sheets

(51) Int. Cl.
*H04W 36/00* (2009.01)
*H04W 36/30* (2009.01)
*H04W 48/20* (2009.01)

(52) U.S. Cl.
CPC ........ *H04W 36/0094* (2013.01); *H04W 48/20* (2013.01)

(56) References Cited

U.S. PATENT DOCUMENTS

| | | |
|---|---|---|
| 2013/0344873 A1 | 12/2013 | Sane et al. |
| 2014/0064247 A1* | 3/2014 | Teyeb ............... H04W 36/0083 370/331 |
| 2014/0098693 A1 | 4/2014 | Tabet et al. |
| 2014/0198655 A1* | 7/2014 | Ishii .................... H04W 76/023 370/235 |
| 2014/0247810 A1* | 9/2014 | Bontu ............... H04W 36/0094 370/332 |
| 2014/0378144 A1 | 12/2014 | Legg et al. |
| 2015/0017923 A1 | 1/2015 | Mutya et al. |
| 2015/0139015 A1 | 5/2015 | Kadous et al. |
| 2016/0066287 A1 | 3/2016 | Webb et al. |

* cited by examiner

PERFORMANCE IMPROVEMENTS FOR HIGH GAIN DEVICES

CROSS REFERENCES

The present Application for Patent claims priority to U.S. Provisional Patent Application No. 62/182,825 by Kinthada Venkata et al., entitled "Performance Improvements for High Gain Devices," filed Jun. 22, 2015, assigned to the assignee hereof.

BACKGROUND

Field of the Disclosure

The following relates generally to wireless communication, and more specifically to performance improvements (e.g., mobile-termination (MT) performance improvements) for high gain devices.

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, etc.). A wireless multiple-access communications system may include a number of base stations, each simultaneously supporting communication for multiple communication devices, which may be otherwise known as user equipment (UE). A base station may communicate with UEs on downlink channels (e.g., for transmissions from a base station to a UE) and uplink channels (e.g., for transmissions from a UE to a base station).

Some UEs may be equipped with one or more high-gain antennas. For example, vehicles such as cars or trucks may include a high-gain antenna located on a top of the vehicle or at other locations of the vehicle. The high-gain antenna may be coupled with a modem or radio located within the vehicle. The high-gain antenna may allow the vehicle, as a UE, to receive downlink communications from a base station at ranges that are greater than those allowed by antennas that are not high-gain antennas. However, while the use of high-gain antennas on vehicles or other devices operating near an edge of a base station's coverage area may result in an increase in the power of a signal transferred from the high-gain antenna to the vehicle's radio, the quality of the signal may still be poor. Therefore, improved methods for identifying and handling poor signal quality when high-gain devices are used are desired.

SUMMARY

A user equipment (UE), such as a vehicle having a high-gain antenna, may operate within a cell that uses at least one of reference signal received power (RSRP)-based cell selection or RSRP-based cell reselection. Thus, when a UE that does not include a high-gain antenna approaches the cell edge, for example, the UE may observe that received signals have both low power and low quality. Because the cell uses RSRP-based cell selection and reselection, the UE that lacks a high-gain antenna may determine, due to the low power of the received signal, that a cell selection/reselection operation should be initiated. However, a UE that includes a high-gain antenna may be enabled to boost a power level of a received signal such that a radio receiving the boosted signal observes that the signal has a sufficient RSRP. Thus, even though the signal quality (such as a reference signal received quality (RSRQ) for example) may be poor, the perceived signal power may be sufficiently high to prevent the UE from initiating a cell selection/reselection operation, even when such an operation could potentially result in a handover of communications to a cell providing better signal power and quality.

Therefore, in a cell that uses at least one of RSRP-based cell selection or RSRP-based cell reselection, the UE may determine that a signal quality of communications from a serving base station is poor. In this case the UE may then apply an offset to a measured RSRP in order to result in an offset RSRP that may be used to trigger a cell selection or reselection. The offset RSRP may also be used to prevent the UE from quickly returning to a cell from which the UE has left due to poor signal quality (e.g., despite a seemingly adequate signal power resulting from the use of a high-gain antenna).

A method of wireless communication is described. The method may include determining that the UE is operating in a cell that uses at least one of RSRP-based cell selection or RSRP-based cell reselection, determining an offset RSRP by applying an offset to a measured RSRP if a signal quality of communications from a serving base station of the cell fails to satisfy a signal quality threshold, and initiating at least one of a cell selection or reselection operation based at least in part on the offset RSRP.

An apparatus for wireless communication is described. The apparatus may include means for determining that the UE is operating in a cell that uses at least one of RSRP-based cell selection or RSRP-based cell reselection, means for determining an offset RSRP by applying an offset to a measured RSRP if a signal quality of communications from a serving base station of the cell fails to satisfy a signal quality threshold, and means for initiating at least one of a cell selection or reselection operation based at least in part on the offset RSRP.

A further apparatus for wireless communication is described. The apparatus may include a processor, memory in electronic communication with the processor, and one or more instructions stored in the memory and operable, when executed by the processor, to cause the apparatus to determine that the UE is operating in a cell that uses at least one of RSRP-based cell selection or RSRP-based cell reselection, determine an offset RSRP by applying an offset to a measured RSRP if a signal quality of communications from a serving base station of the cell fails to satisfy a signal quality threshold, and initiate at least one of a cell selection or reselection operation based at least in part on the offset RSRP.

A non-transitory computer-readable medium storing code for wireless communication is described. The code may include one or more instructions executable to determine that the UE is operating in a cell that uses at least one of RSRP-based cell selection or RSRP-based cell reselection, determine an offset RSRP by applying an offset to a measured RSRP if a signal quality of communications from a serving base station of the cell fails to satisfy a signal quality threshold, and initiate at least one of a cell selection or reselection operation based at least in part on the offset RSRP.

Some examples of the method, apparatuses, or non-transitory computer-readable medium described herein may further include processes, features, means, or one or more instructions for initiating at least one of the cell selection or reselection operation based on a non-offset RSRP if the initiating based at least on the offset RSRP is unsuccessful. Additional examples of the method, apparatuses, or non-transitory computer-readable medium described herein may further include processes, features, means, or one or more instructions for determining the signal quality of the communications by measuring an RSRQ of the communications from the serving base station. Additionally or alternatively, some examples may include processes, features, means, or one or more instructions for determining the signal quality of the communications by using a weighted average of at least a threshold number of RSRQ measurements of the communications from the serving base station.

Some examples of the method, apparatuses, or non-transitory computer-readable medium described herein may further include processes, features, means, or one or more instructions for determining that the signal quality of the communications is based at least in part on at least a threshold number of RSRQ measurements of the communications from the serving base station before determining that the signal quality of communications from the serving base station of the cell fails to satisfy the signal quality threshold. Additionally or alternatively, in some examples the signal quality threshold is based at least in part on an initial signal quality threshold and a signal quality offset.

Some examples of the method, apparatuses, or non-transitory computer-readable medium described herein may further include processes, features, means, or one or more instructions for determining that the cell is a Long-Term Evolution (LTE) cell, and applying the offset to the measured RSRP of at least one of the communications from the serving base station and communications from base stations of neighboring cells. Additionally or alternatively, some examples may include processes, features, means, or one or more instructions for determining that the cell is not an LTE cell, and applying the offset to the measured RSRP of communications from a base station of a neighboring cell which is an LTE cell.

Some examples of the method, apparatuses, or non-transitory computer-readable medium described herein may further include processes, features, means, or one or more instructions for determining that the UE is enabled to search for inter-frequency LTE cells or cells using other radio access technologies (RATs). Additionally or alternatively, some examples may include processes, features, means, or one or more instructions for determining that at least one neighboring cell is enabled for inter-frequency or inter-RAT handover.

Some examples of the method, apparatuses, or non-transitory computer-readable medium described herein may further include processes, features, means, or one or more instructions for determining that signal quality-based cell selection or reselection is not enabled in the cell. Additionally or alternatively, some examples may include processes, features, means, or one or more instructions for determining that signal quality-based cell selection or reselection is not enabled in neighboring cells.

In some examples of the method, apparatuses, or non-transitory computer-readable medium described herein, the UE is at least a portion of a vehicle.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
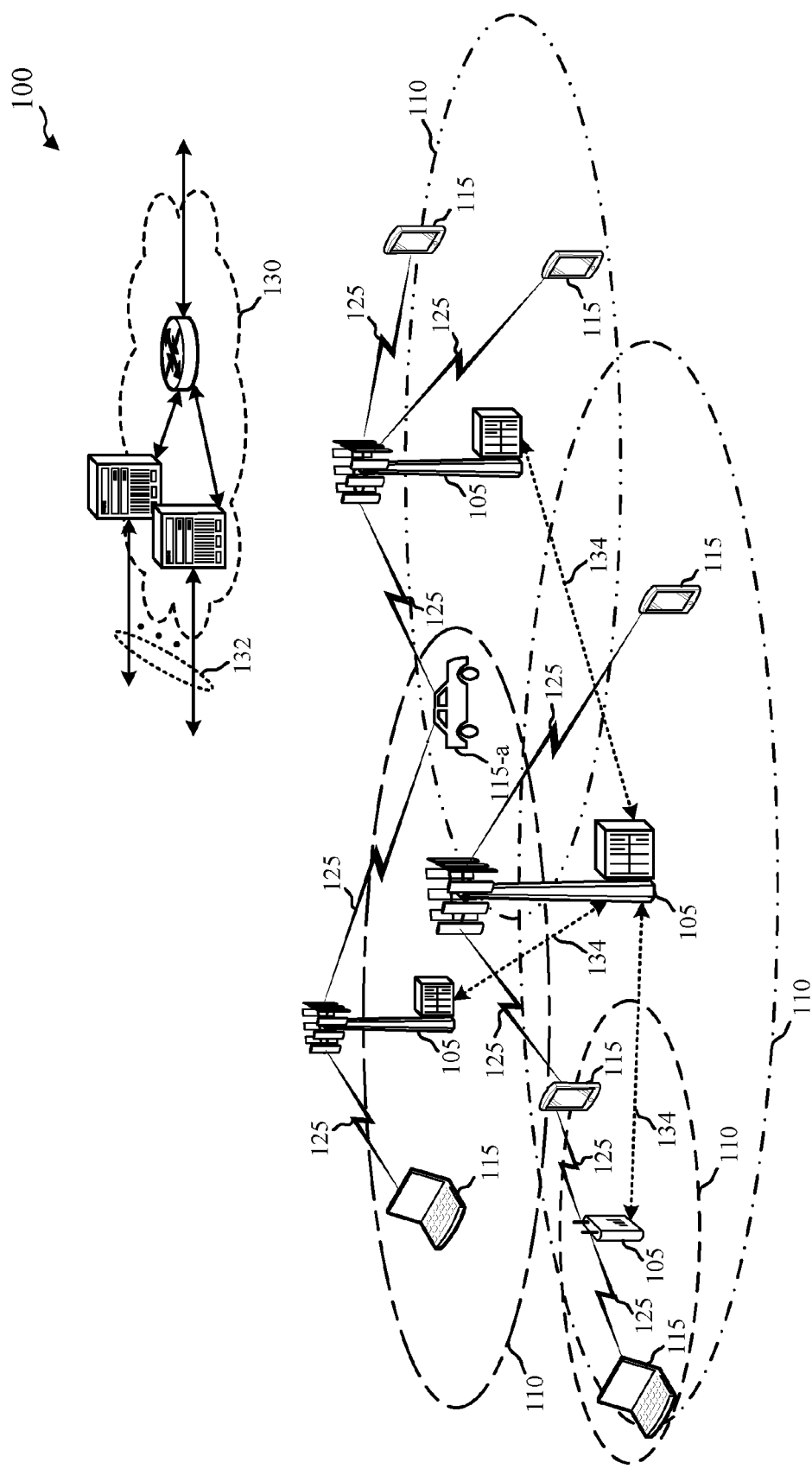
FIG. 1 illustrates an example of a wireless communications system that supports performance improvements (e.g., mobile-termination (MT) performance improvements) for high gain devices in accordance with various aspects of the present disclosure.

Some user equipments (UEs), such as vehicles (e.g., cars, trucks, etc.) may be equipped with one or more high-gain antennas. The high-gain antennas may be used to increase the power of a received signal prior to the signal being processed by a coupled modem or radio located within the vehicle. Thus, a high-gain antenna may allow a vehicle, acting as a UE, to receive downlink communications from a base station at ranges that are greater than those allowed by antennas that are not high-gain antennas. In some situations, however, and especially when the UE or vehicle is located near an edge of a base station's coverage area, the UE may receive a signal (e.g., due to the use of a high-gain antenna) that might not otherwise be receivable. The received signal may be amplified by the high-gain antenna in order to allow processing of the signal. However, even though the signal has been amplified, the signal may nevertheless have poor quality. While the high-gain antenna may allow the UE to receive relatively weak signals, the UE may still not be able to effectively use a received signal due to the signal's poor quality.

When a UE that is not equipped with a high-gain antenna receives a signal whose power or quality is below a threshold, the UE may initiate a search to identify a different cell from which the UE may receive signals having sufficient power and/or quality. A cell selection/reselection operation may be initiated based on various measurements. In some cells, the cell selection/reselection operation may be triggered based on a low received power condition. Thus, a UE may perform a reference signal received power (RSRP) measurement on a received signal. If the cell with which the UE is in communication uses RSRP-based criteria for cell selection and/or reselection, then the UE that measures an RSRP that is below a minimum threshold may be triggered to begin searching for another cell from which to receive communications.

Therefore, a UE that is equipped with a high-gain antenna may potentially be caught in a situation where cell selection and/or reselection is not triggered, even though the UE might have better communications by using a different cell. If the UE having a high-gain antenna is in communication with a cell that uses at least one of RSRP-based cell selection or RSRP-based cell reselection, the UE may receive signals that are sufficiently amplified to avoid triggering a cell selection/reselection operation, even though the received signals are unusable due to poor quality.

One solution to this dilemma is to, in one or more certain conditions, apply an offset to a measured RSRP value such that the offset favors the triggering of a cell selection/reselection operation. The considered one or more conditions may include signal quality conditions. For example, if a quality of a received signal is below a predetermined threshold, then an offset may be applied to a measured RSRP value. Signal quality may be determined, for example, through a reference signal received quality (RSRQ) measurement. A measured RSRQ value may be filtered and/or otherwise processed to remove noise and other artifacts from the measurement, and then may be compared with a signal quality threshold to determine whether an offset should be applied to an RSRP measurement. The offset may be applied so as to discourage the UE from bouncing back and forth ("ping-ponging") between cells, as will be explained in detail below.

Aspects of the disclosure are initially described in the context of a wireless communication system. Specific examples are provided pertaining to UEs that have high-gain antennas. These and other aspects of the disclosure are further illustrated by and described with reference to apparatus diagrams, system diagrams, and flowcharts that relate to performance improvements (e.g., mobile-termination (MT) performance improvements) for high gain devices.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. In other examples, the wireless communications system 100 may include multiple radio access technologies (RATs). For example, the wireless communications system 100 may include base stations 105 that provide LTE/LTE-A coverage, as well as base stations 105 that provide other coverage such as Universal Terrestrial Radio Access (UTRA), etc., which may include wideband code division multiple access (WCDMA) and other variants of code division multiple access (CDMA) as well as Global System for Mobile Communications (GSM).

Base stations 105 may wirelessly communicate with UEs 115 (e.g., using various RATs or wireless technologies) via one or more base station antennas. Each base station 105 may provide communication coverage for a respective geographic coverage area 110. Each base station 105 may provide communication coverage for a macro cell, a small cell, or other types of cell. The term "cell" is a 3rd Generation Partnership Project (3GPP) term that can be used to describe a base station, a carrier or component carrier associated with a base station, or a coverage area (e.g., sector, etc.) of a carrier or base station, depending on context. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, wireless communication UE apparatus, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. A base station 105 may also be referred to as an access point (AP), a Node B, Radio Network Controller (RNC), evolved Node B (eNB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

In some cases, a UE 115 may be transferred from a serving base station 105 (known as a source base station) to another base station 105 (known as a target base station). For example, a UE 115 may be moving into the coverage area of a target base station 105, or a target base station 105 may be capable of providing better service for the UE 115 or relieving a source base station 105 of excess load. The transition may be referred to as a "handover." Prior to a handover, the source base station 105 may configure the UE 115 with procedures for measuring the signal quality and/or power of neighboring base stations 105. The UE 115 may then respond with a measurement report. The source base station 105 may use the measurement report to make the handover decision. The decision may also be based on radio resource management (RRM) factors such as network load and interference mitigation. When the handover decision is made, the source base station 105 may send a handover request message to the target base station 105, which may include context information to prepare the target base station 105 to serve the UE 115. The target base station 105 may make an admission control decision, for example, to ensure that it can meet the quality of service (QoS) standards of the UE 115. The target base station 105 may then configure resources for the incoming UE 115, and send a handover request acknowledge message to the source base station 105, which may include radio resource control (RRC) information to be passed on to the UE 115. The source base station 105 may then direct the UE 115 to perform the handover, and pass a status transfer message to the target base station with packet data convergence protocol (PDCP) bearer status information. The UE 115 may attach to the target base station via a random access channel (RACH) procedure.

A UE 115 may perform a cell selection procedure to establish a connection with a base station 105 or to reselect a neighboring cell with better performance or higher priority. The selection procedure may include a determination of whether a candidate cell meets minimum selection criteria (S-criteria) and may include selecting from among several available cells. S-criteria may include RSRP or RSRQ, a minimum signal power threshold, a public land mobile network (PLMN) priority offset, a maximum transmit power, and a hysteresis parameter (e.g., to avoid ping-ponging between cells). Each cell may transmit its own minimum RSRP, cell priority, and/or maximum transmit power over system information block (SIB)1, and/or may convey corresponding values for neighboring cells in SIB4 and SIB5.

Wireless communications network 100 includes UE 115-a, which may be a vehicle having a high-gain antenna. Vehicles may sometimes be configured as UEs. In some examples, UE 115-a may include advanced features such as remote unlock, diagnostics, etc. UE 115-a may use a short message service (SMS) and/or other communication protocol of the wireless communications network 100 to receive signals directed to UE 115-a. The received signals may be transmitted via a base station 105. However, as UE 115-a approaches the edge of a base station's geographic coverage area 110, the UE 115-a may initiate a cell selection/reselection operation in order to ensure that the UE 115-a is receiving a useable signal.

Figure 2:
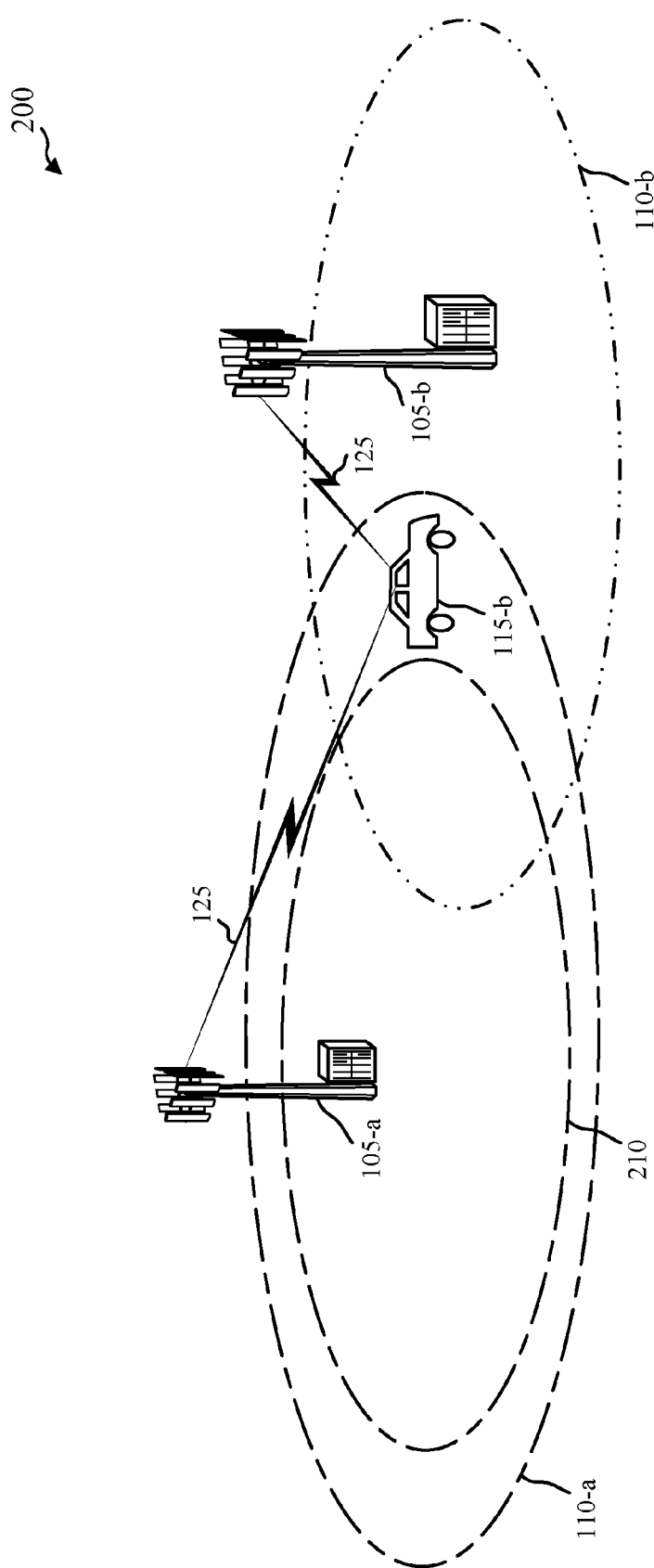
FIG. 2 illustrates an example of a wireless communications subsystem that supports performance improvements (e.g., MT performance improvements) for high gain devices in accordance with various aspects of the present disclosure.

FIG. 2 illustrates an example of a wireless communications subsystem 200 for performance improvements (e.g., MT performance improvements) for high gain devices in accordance with various aspects of the present disclosure. Wireless communications subsystem 200 may include a UE 115-b and base stations 105-a, 105-b, which may be examples of UE 115-a and base stations 105 described with reference to FIG. 1. Base stations 105-a, 105-b may communicate with the UE 115-b via communication links 125. Each base station 105-a, 105-b may also include a respective geographic coverage area 110-a, 110-b.

In the wireless communications subsystem 200, UE 115-b is illustrated as somewhere near an edge of the geographic coverage area 110-a of base station 105-a. While UE 115-b is within the geographic coverage area 110-a of base station 105-a, UE 115-b may receive signals from the base station 105-a. The received signals may be vehicle-specific signals, for example, such as remote unlock or diagnostic signals. In the example of FIG. 2, the base stations 105-a, 105-b are part of cells that may use at least one of RSRP-based cell selection or RSRP-based cell reselection criteria. Thus, as long as UE 115-b receives signals from base station 105-a that have an RSRP that is above a threshold, the UE 115-b will continue to communicate or "camp" on base station 105-a.

However, UE 115-b may travel to a position near the edge of geographic coverage area 110-a. As shown in FIG. 2, UE 115-b is located near the edge of geographic coverage area 110-a and beyond an acceptable RSRP boundary 210. The acceptable RSRP boundary 210 represents a boundary beyond which a UE 115 that does not include a high-gain antenna would receive signals whose RSRP measurement is below a threshold such that the UE 115 would be triggered to initiate a cell selection/reselection operation. In FIG. 2, however, UE 115-b is located beyond the acceptable RSRP boundary 210. Because UE 115-b includes a high-gain antenna, the UE 115-b may be able to amplify a signal received from base station 105-a such that the RSRP of the received signal is greater than a threshold which would trigger a cell selection/reselection operation, even when a quality of the received signal may render the signal unusable.

Accordingly, UE 115-b may be configured to measure a signal quality and then use the measured signal quality to determine whether an offset should be applied to a measured RSRP so as to more readily trigger initiation of a cell selection/reselection operation. For example, in FIG. 2, UE 115-b is not only within the geographic coverage area 110-a of base station 105-a, but UE 115-b is also within the geographic coverage area 110-b of base station 105-b. Therefore, UE 115-b, if triggered through a low signal quality measurement to apply an offset to a measured RSRP and thus initiate a cell selection/reselection operation, could search for available cells and may identify base station 105-b as a potential replacement for base station 105-a. Once handover was complete and UE 115-b was in communication with base station 105-b, UE 115-b could apply or continue to apply an offset to RSRP measurements of signals received from base station 105-a to prevent ping-ponging of the UE 115-b between the base stations 105-a, 105-b. Base stations 105-a, 105-b may be of a same radio access type or may be different. For example, base station 105-a may be part of an LTE/LTE-A cell using a given frequency, while base station 105-b may be part of an LTE/LTE-A cell using a different frequency. Alternatively, base station 105-a may be part of an LTE/LTE-A cell while base station 105-b may be part of a non-LTE cell (such as, for example, GSM or WCDMA, etc.).

Figure 3:
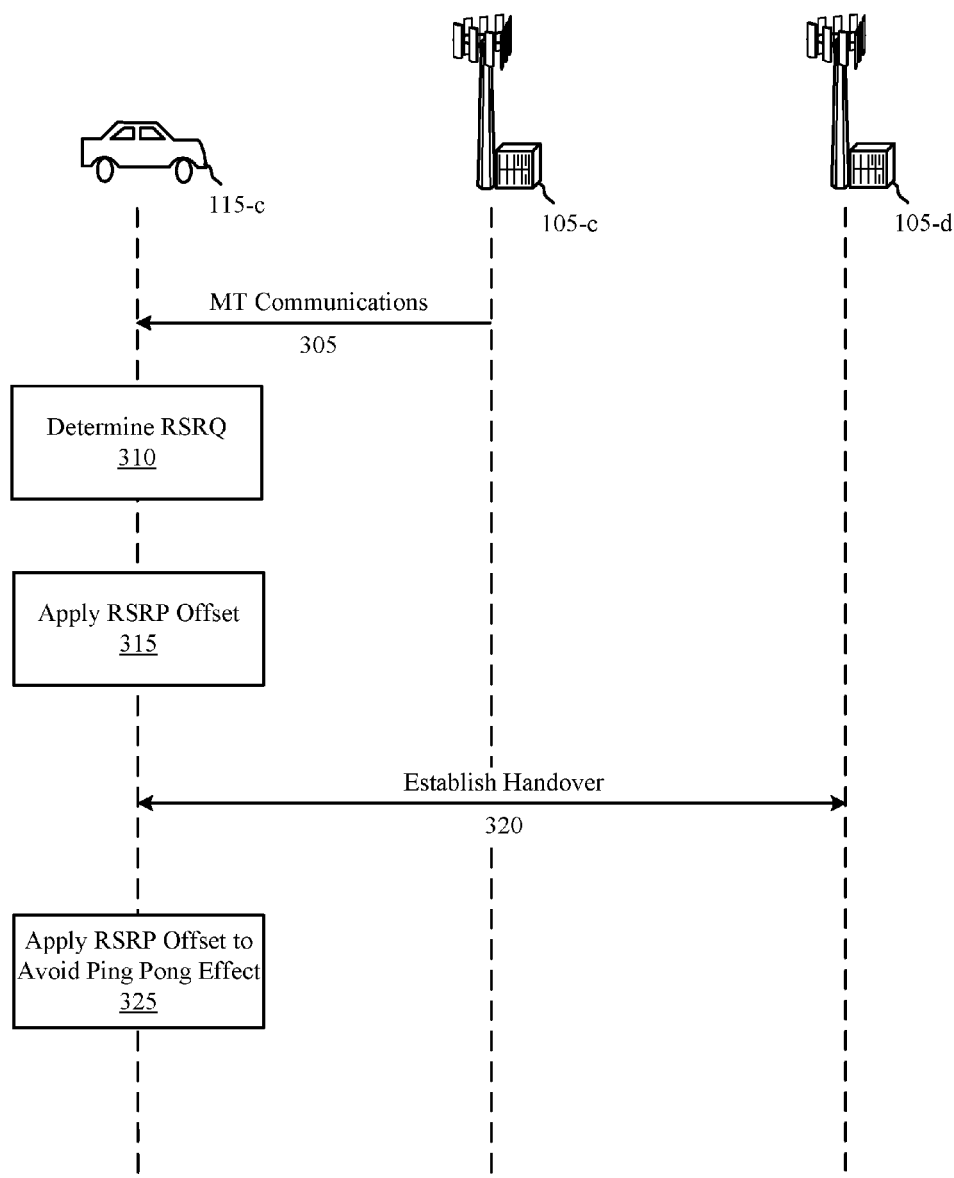
FIG. 3 illustrates an example of a process flow for applying an offset to a reference signal received power (RSRP) measurement in order to improve performance of high gain devices in accordance with various aspects of the present disclosure.

FIG. 3 illustrates an example of a process flow 300 for performance improvements (e.g., MT performance improvements) for high gain devices in accordance with various aspects of the present disclosure. Process flow 300 may include a UE 115-c and base stations 105-c, 105-d, which may be examples of the UEs 115 and base stations 105 described with reference to FIGS. 1 and 2. Specifically, UE 115-c may include a high-gain antenna and thus may be prone to RSRP-based cell selection/reselection paralysis, for example, when near an edge of a cell geographic coverage area 110.

The UE 115-c may be operating in a cell that uses RSRP-based cell selection and reselection. At step 305, the UE 115-c may receive MT communications from a base station 105-c. In an example, base station 105-c may be part of an LTE/LIE-A cell. The UE 115-c may receive the MT communications and may use a high-gain antenna to amplify the MT communications. However, the signal quality of the MT communications may be poor.

At step 310, the UE 115-c may determine a signal quality of the received MT communications. The UE 115-c may determine the signal quality by measuring an RSRQ value of the MT communications. The measured RSRQ value may be averaged or otherwise filtered to ensure that a stable RSRQ value is being considered. In some examples, the RSRQ value is determined based on a weighted average including one or more previous RSRQ values.

At step 315, the UE 115-c may determine whether an RSRP offset should be applied to a measured RSRP value. This determination may be made by comparing the filtered RSRQ value with a signal quality threshold. In aspects, the signal quality threshold may include an initial signal quality threshold and an additional signal quality offset. The signal quality offset may be selected in order to bias the UE 115-c in favor of initiating a cell selection/reselection operation to leave a poor-quality LTE/LTE-A cell and to remain camped on a non-LTE/LTE-A cell with stronger signal quality. If the filtered RSRQ value is determined to be less than the signal quality threshold, then an RSRP offset may be applied to a measured RSRP value. The resulting offset RSRP value may be used in the UE 115-c consideration of whether to initiate a cell selection/reselection operation. If the offset RSRP value does not satisfy a threshold (e.g., is lower than a minimum threshold), for example, the UE 115-c may begin searching for a different cell to replace the communications with base station 105-c.

At step 320, UE 115-c identifies base station 105-d as a replacement base station for base station 105-c and establishes a handover of communications from base station 105-c to base station 105-d. Base station 105-d may, for example, be part of a non-LTE/LTE-A cell. While the UE 115-c is camped on base station 105-d, the UE 115-c may continue to search and measure signals received from other base stations, including from base station 105-c. Therefore, in order to avoid a quick return back to base station 105-c (e.g., the "ping-pong" effect), UE 115-c may continue to apply its RSRP offset to RSRP values measured from signals received from base station 105-c, thus biasing the UE 115-c to remain camped on base station 105-d. The bias, however, can be overcome if the signal received from base station 105-c is sufficiently strong to overcome the effects of the applied RSRP offset. In the event that no base station is identified as a replacement base station for base station 105-c (at step 320), UE 115-c may initiate at least one of the cell selection or reselection operation based on a non-offset RSRP.

Figure 4:
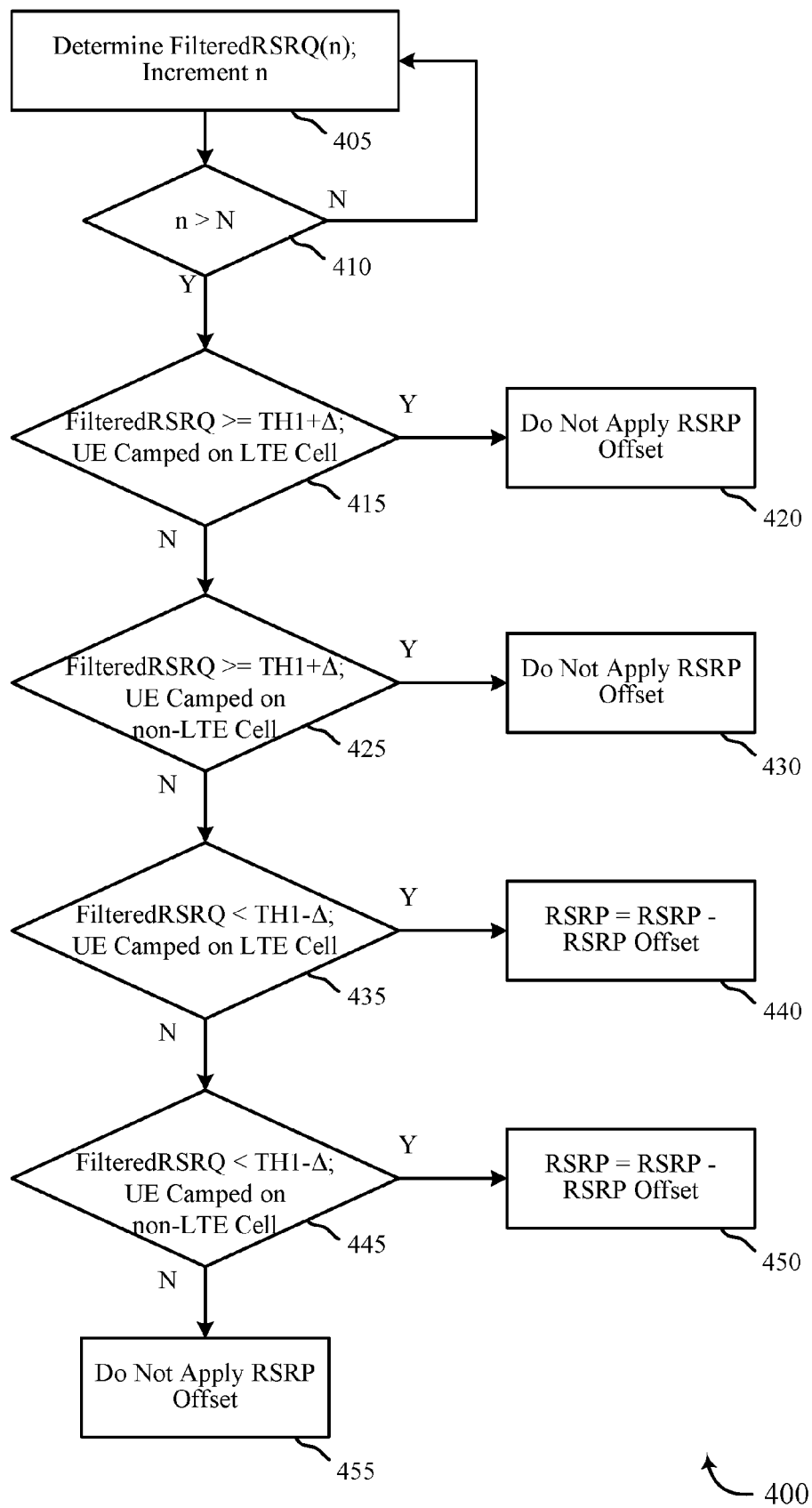
FIG. 4 illustrates an example of another flow chart for applying an offset to a reference signal received power (RSRP) measurement in order to improve performance of high gain devices in accordance with various aspects of the present disclosure.

FIG. 4 illustrates an example of a flow chart 400 for performance improvements (e.g., MT performance improvements) for high gain devices in accordance with various aspects of the present disclosure. The flow chart 400 may be performed by a UE 115, which may be an example of a UE 115 illustrated and described with reference to FIGS. 1-3.

At step 405, the UE 115 may determine a filtered RSRQ value. The filtered RSRQ value may be a function of a specific sample n, and may thus be sometimes referred to as FilteredRSRQ(n). The filtered RSRQ value may be determined, for example, as a weighted average of multiple measured RSRQ values. In one example, the filtered RSRQ value may be determined in accordance with Equation 1:

$$\text{FilteredRSRQ}(n) = \alpha * \text{FilteredRSRQ}(n-1) + (1-\alpha) * \text{RSRQ}(n) \quad \text{Equation 1}$$

In Equation 1, RSRQ(n) represents the measured RSRQ value of a serving base station at sample n. FilteredRSRQ(n) represents the filtered RSRQ value of a serving base station at sample n, and may be based on the nth value of the measured RSRQ value and the n−1 value of the FilteredRSRQ value. A filter coefficient, α, may be used to weight the amount of emphasis that is applied to both the actual measured RSRQ values and the previously filtered RSRQ values.

Additionally, at step 405, the sample value n is incremented. This allows for a determination to be made at step 410 of whether a sufficient number of samples n have been considered in determining the Filtered RSRQ value. If fewer than a predetermined number N of samples have been considered and averaged/filtered into the determination of FilteredRSRQ, then the flow continues back to step 405 to recalculate the value of FilteredRSRQ using additional measured RSRQ values. If, on the other hand, the number of sample values n exceeds the predetermined number N of samples required to be considered, then the flow 400 may continue to apply the calculated Filtered RSRQ value in the subsequent determination of whether an offset should be applied to a measured RSRP value. Some hysteresis is provided by requiring that the number of sample values n considered be greater than the predetermined number of samples N before additional decisions are made based on the calculated FilteredRSRQ.

At steps 415, 425, 435, and 445, various comparisons are made. At step 415, a determination is made that the UE 115 is camped on an LTE/LTE-A cell. In this case, the FilteredRSRQ value is compared with a signal quality threshold. The signal quality threshold may include an initial signal quality threshold TH1 and a signal quality offset Δ. The values of the initial signal quality threshold TH1 and the signal quality offset Δ may be predetermined. The initial signal quality threshold TH1 may be close in value to a threshServingLowQ value that could be set in LTE cells that use RSRQ-based cell selection/reselection, as communicated, for example, in one or more system information blocks (SIBs). Alternatively, the initial signal quality threshold TH1 may be experimentally determined. The signal quality offset Δ may also be experimentally determined and may be set so as to require that the FilteredRSRQ value be sufficiently greater than the initial signal quality threshold TH1 if the UE 115 is to remain camped on the LTE cell.

At step 415, the FilteredRSRQ value is compared with the sum of the initial signal quality threshold TH1 and the signal quality offset Δ. If the FilteredRSRQ value is greater or equal than the determined difference, the UE 115 may elect to not apply an RSRP offset to a measured RSRP value (at step 420). The reason for not applying the RSRP offset is that the FilteredRSRQ value is sufficiently large, meaning that the received signal quality from the serving base station of the LTE/LTE-A cell is good enough.

Step 425 is considered when the UE 115 is camped on a non-LTE cell. At step 425, the FilteredRSRQ value is compared with the sum of the initial signal quality threshold TH1 and the signal quality offset Δ. In this case, as the UE 115 is not camped on an LTE/LTE-A cell, the FilteredRSRQ value used may be calculated using Equation 1 above or may be determined in some other manner as well such that the FilteredRSRQ value is closer in value to an existing measured value. If the FilteredRSRQ value is greater than or equal to the determined sum, the UE 115 may again elect to not apply an RSRP offset to a measured RSRP value (e.g., of a neighboring LTE/LTE-A cell) (at step 430).

Step 435 is considered when the UE 115 is camped on an LTE/LTE-A cell. In this case, a check is made whether the determined FilteredRSRQ value does not satisfy (e.g., is less than) the signal quality threshold. And, in this case, the signal quality threshold is a difference between the initial signal quality threshold TH1 and the signal quality offset Δ. If the FilteredRSRQ is indeed less than the difference of the initial signal quality threshold TH1 and the signal quality offset Δ, then an RSRP offset may be applied to one or more measured RSRP values from one or more of the serving base station, and additionally or alternatively, to any other inter-frequency and/or intra-frequency neighboring base stations (step 440). The calculated RSRP value, sometimes referred to as the offset RSRP value, may be equal to a difference between the actual or measured RSRP value and a predetermined RSRP offset value.

Step 445 is considered when the UE 115 is camped on a non-LTE/LTE-A cell. In this case, a check is made whether the determined FilteredRSRQ value is less than the signal quality threshold, which is a difference of the initial signal quality threshold TH1 and the signal quality offset Δ. If the FilteredRSRQ is indeed less than the determined difference, then an RSRP offset may be applied to the one or more measured RSRP values (e.g., from neighboring LTE/LTE-A base stations) (step 450). The offset RSRP value may be equal to a difference between the actual or measured RSRP value and a predetermined RSRP offset value.

If the condition in step 445 is not satisfied, or if none of the conditions of steps 415, 425, 435, 445 are satisfied, then no RSRP offset is applied (step 455). The steps 415, 425, 435, 445 may be applied in any order.

In addition to the conditions identified in flow chart 400, some additional conditions may be determined before an RSRP offset may be applied. For example, the UE 115 may be determined to be in an automatic mode, meaning that the UE may be enabled to initiate a cell selection/reselection operation to search for inter-frequency and inter-radio access technology (RAT) cells. Maximum flexibility may arise when the UE 115 is not in an LTE-only mode. Additionally, the UE 115 may verify that the UE 115 is camped on a serving cell and has at least one neighbor cell which provide for inter-RAT handovers.

Further, the method outlined in FIGS. 3 and 4 may be disabled if the UE 115 is located in a cell that uses RSRQ-based cell selection/reselection. In other words, if the UE 115 is located in a cell that broadcasts a threshServingLowQ value in, for example, SIB3, then the UE 115 is located in a cell that already provides signal quality-based cell selection/reselection. Therefore, the methods outlined in FIGS. 3 and 4 may be for cells that use RSRP-based cell selection/reselection. Similarly, the method outlined in FIGS. 3 and 4 may be disabled if a UE 115 camped on a non-LTE/LTE-A cell that supports signal quality-based selection/reselection of LTE/LTE-A cells. Additionally, if cell selection or reselection fails after application of the methods outlined in FIGS. 3 and 4, a non-offset RSRP may be used for cell selection or reselection.

Figure 5:
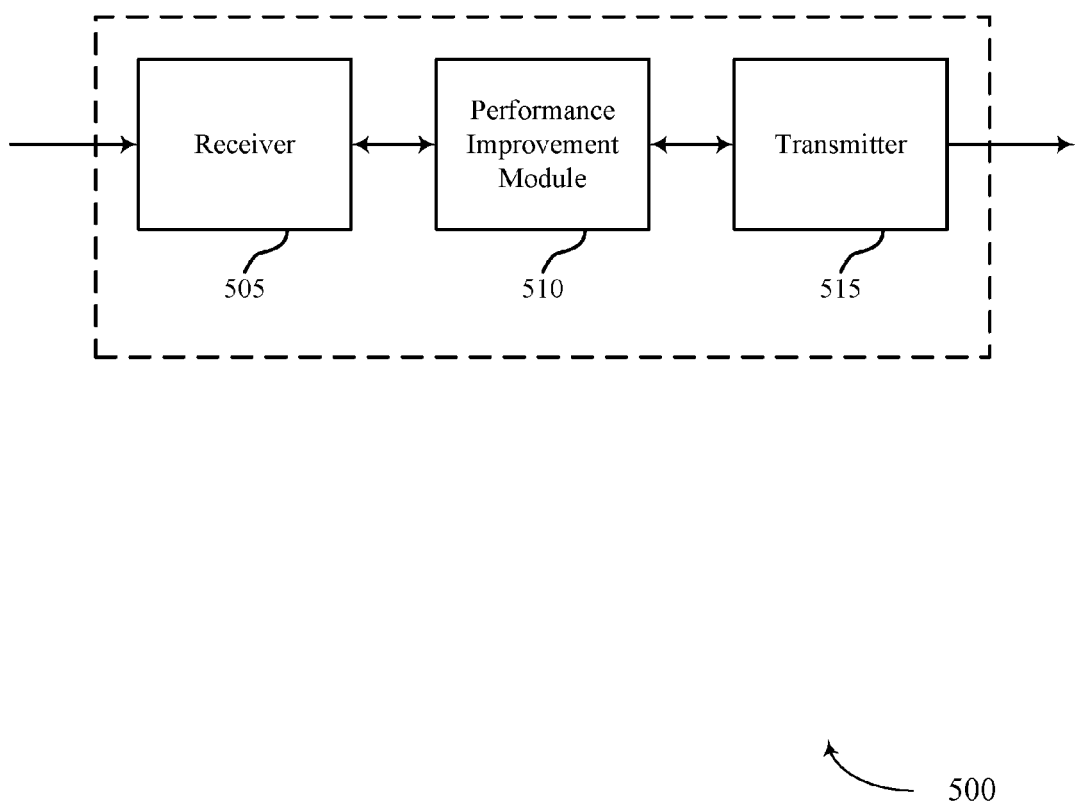
FIGS. 5-7 show block diagrams of a wireless device that supports performance improvements (e.g., MT performance improvements) for high gain devices in accordance with various aspects of the present disclosure.

FIG. 5 shows a block diagram of a wireless device 500 configured for performance improvements (e.g., MT performance improvements) for high gain devices in accordance with various aspects of the present disclosure. Wireless device 500 may be an example of aspects of a UE 115 described with reference to FIGS. 1-4. Wireless device 500 may include a receiver 505, an performance improvement module (e.g., MT performance improvement module) 510, or a transmitter 515. Wireless device 500 may also include a processor. Each of these components may be in communication with each other.

The receiver 505 may receive information such as packets, user data, or control information associated with various information channels (e.g., control channels, data channels, and information related to performance improvements (e.g., MT performance improvements) for high gain devices, etc.). Information may be passed on to the MT performance improvement module 510, and to other components of wireless device 500. The receiver 505 may include at least one high-gain antenna.

The performance improvement module 510 may determine that the UE is operating in a cell that uses at least one of RSRP-based cell selection or RSRP-based reselection. The performance improvement module 510 may determine an offset RSRP by applying an offset to a measured RSRP if a signal quality of communications from a serving base station of the cell fails to satisfy a signal quality threshold. Additionally, the performance improvement module 510 may initiate a cell selection and/or reselection operation based at least in part on the offset RSRP.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas.

Figure 6:
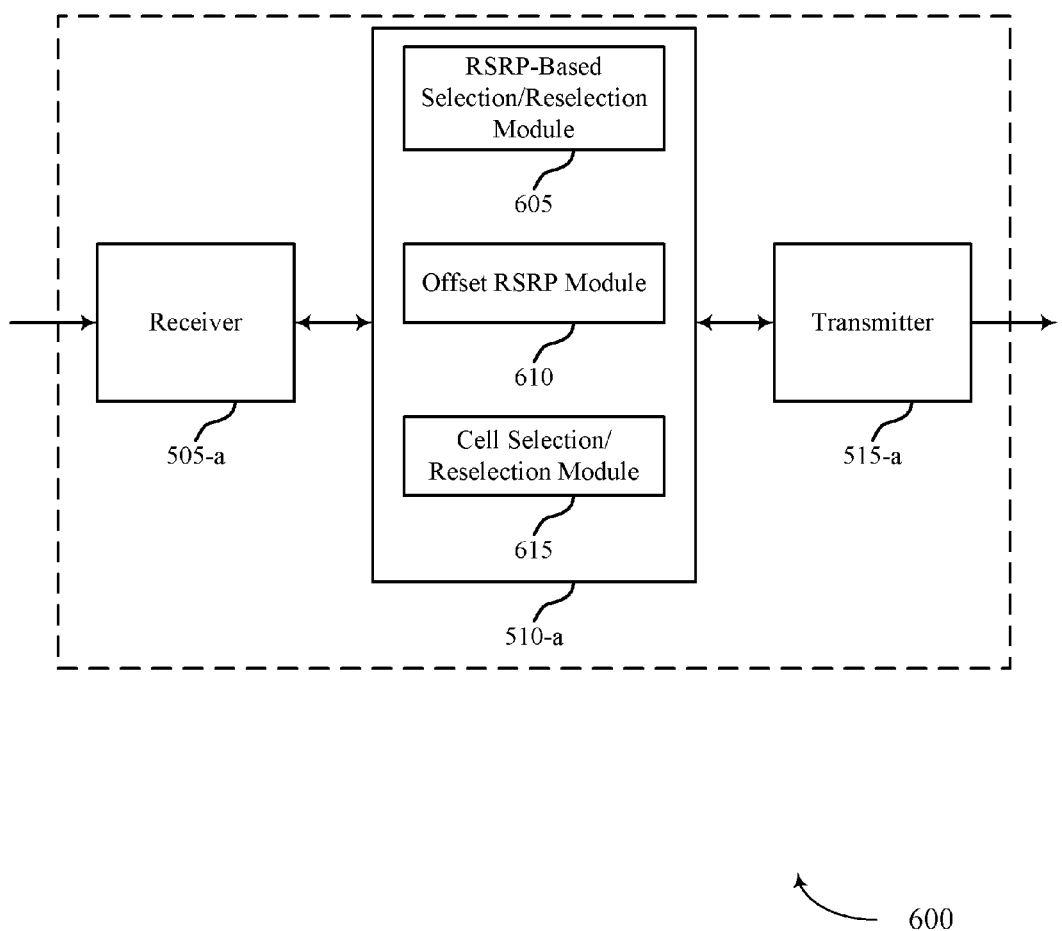

FIG. 6 shows a block diagram of a wireless device 600 for performance improvements (e.g., MT performance improvements) for high gain devices in accordance with various aspects of the present disclosure. Wireless device 600 may be an example of aspects of a wireless device 500 or a UE 115 described with reference to FIGS. 1-5. Wireless device 600 may include a receiver 505-*a*, a performance improvement module 510-*a*, or a transmitter 515-*a*. Wireless device 600 may also include a processor. Each of these components may be in communication with each other. The performance improvement module 510-*a* may include an RSRP-based selection/reselection module 605, an offset RSRP module 610, and a cell selection/reselection module 615. In some examples, the wireless device 600 may be at least a portion of a vehicle.

The receiver 505-*a* may receive information which may be passed on to performance improvement module 510-*a*, and to other components of wireless device 600. The performance improvement module 510-*a* may perform the operations described with reference to FIG. 5. The transmitter 515-*a* may transmit signals received from other components of wireless device 600.

The RSRP-based selection/reselection module 605 may determine that the wireless device 600 is operating in a cell that uses RSRP-based cell selection and reselection, as described with reference to FIGS. 2-4. In some examples, the RSRP-based cell selection/reselection module 605 may also be used to determine whether the wireless device 600 is in an automatic mode or in an LTE-only mode. Additionally or alternatively, in some examples, the RSRP-based cell selection/reselection module 605 may be used to determine whether the wireless device 600 is camped in a cell that has inter-RAT neighboring cells. Additionally or alternatively, in some examples, the RSRP-based cell selection/reselection module 605 may be used to determine whether the wireless device 600 is camped in a cell that uses signal quality-based cell selection and/or reselection.

The offset RSRP module 610 may determine an offset RSRP by applying an offset to a measured RSRP if a signal quality of communications from a serving base station of the cell fails to satisfy a signal quality threshold as described with reference to FIGS. 2-4. The offset RSRP module 610 may determine that the cell is an LTE cell, and may apply the offset to the measured RSRP of at least one of the communications from the serving base station and/or communications from one or more base stations of neighboring cells. The offset RSRP module 610 may determine that the cell is not an LTE cell, and may apply the offset to the measured RSRP of communications from a base station of a neighboring cell which is an LTE cell.

The cell selection/reselection module 615 may initiate a cell selection or reselection operation based at least in part on the offset RSRP as described with reference to FIGS. 2-4.

Figure 7:
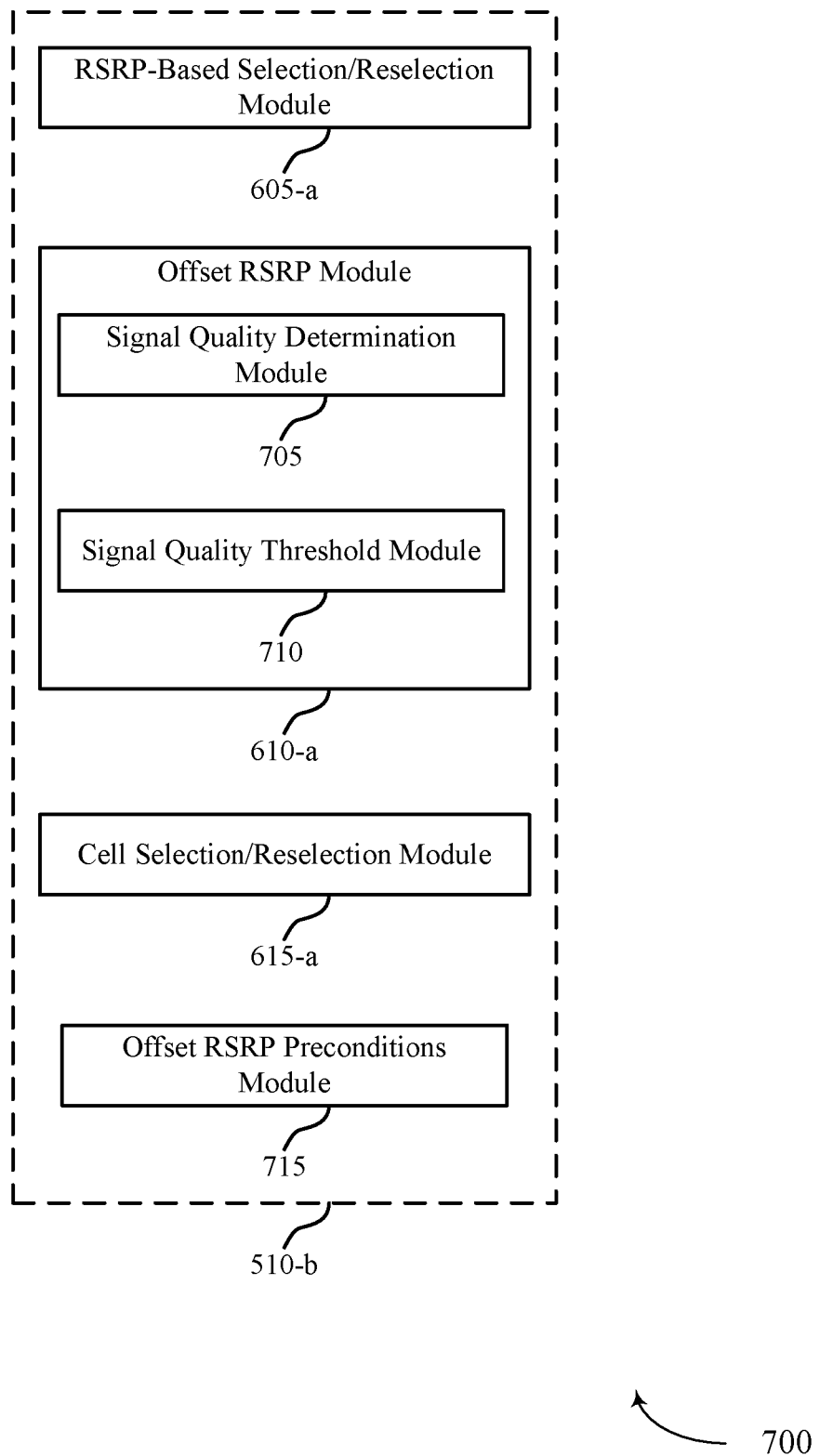

FIG. 7 shows a block diagram 700 of a performance improvement module (e.g., MT performance improvement module) 510-*b* which may be a component of a wireless device 500 or a wireless device 600 for performance improvements for high gain devices in accordance with various aspects of the present disclosure. The performance improvement module 510-*b* may be an example of aspects of a performance improvement module 510 described with reference to FIGS. 5 and 6. The performance improvement module 510-*b* may include a RSRP-based selection/reselection module 605-*a*, an offset RSRP module 610-*a*, and a cell selection/reselection module 615-*a*. Each of these modules may perform the functions described with reference to FIG. 6. The offset RSRP module 610-*a* may include a signal quality determination module 705 and/or a signal quality threshold module 710. The performance improvement module 510-*b* may include an offset RSRP preconditions module 715.

The signal quality determination module 705 may be part of the offset RSRP module 610-*a* and may determine the signal quality of communications by measuring an RSRQ of the communications from a serving base station as described with reference to FIGS. 2-4. The signal quality determination module 705 may determine the signal quality of communications from base stations of neighboring cells, including from LTE/LTE-A cells. The signal quality determination module 705 may determine the signal quality of the communications by using a weighted average of at least a threshold number of RSRQ measurements. The signal quality determination may be made using at least a threshold number of RSRQ measurements before the determined signal quality is compared with a signal quality threshold for determining whether to apply an offset to a measured RSRP value.

The signal quality threshold module 710 may be configured to set a signal quality threshold based at least in part on an initial signal quality threshold and a signal quality offset as described with reference to FIGS. 2-4.

The offset RSRP preconditions module 715 may determine that the wireless device 500, 600 is enabled to search for inter-frequency LTE cells or cells using other RATs as described with reference to FIGS. 2-4. Additionally or alternatively, the offset RSRP preconditions module 715 may determine that at least one neighboring cell is enabled for inter-frequency or inter-RAT handover. Additionally or alternatively, the offset RSRP preconditions module 715 may determine that signal quality-based cell selection or reselection is not enabled in the serving cell, and/or that signal quality-based cell selection or reselection is not enabled in neighboring cells.

Figure 8:
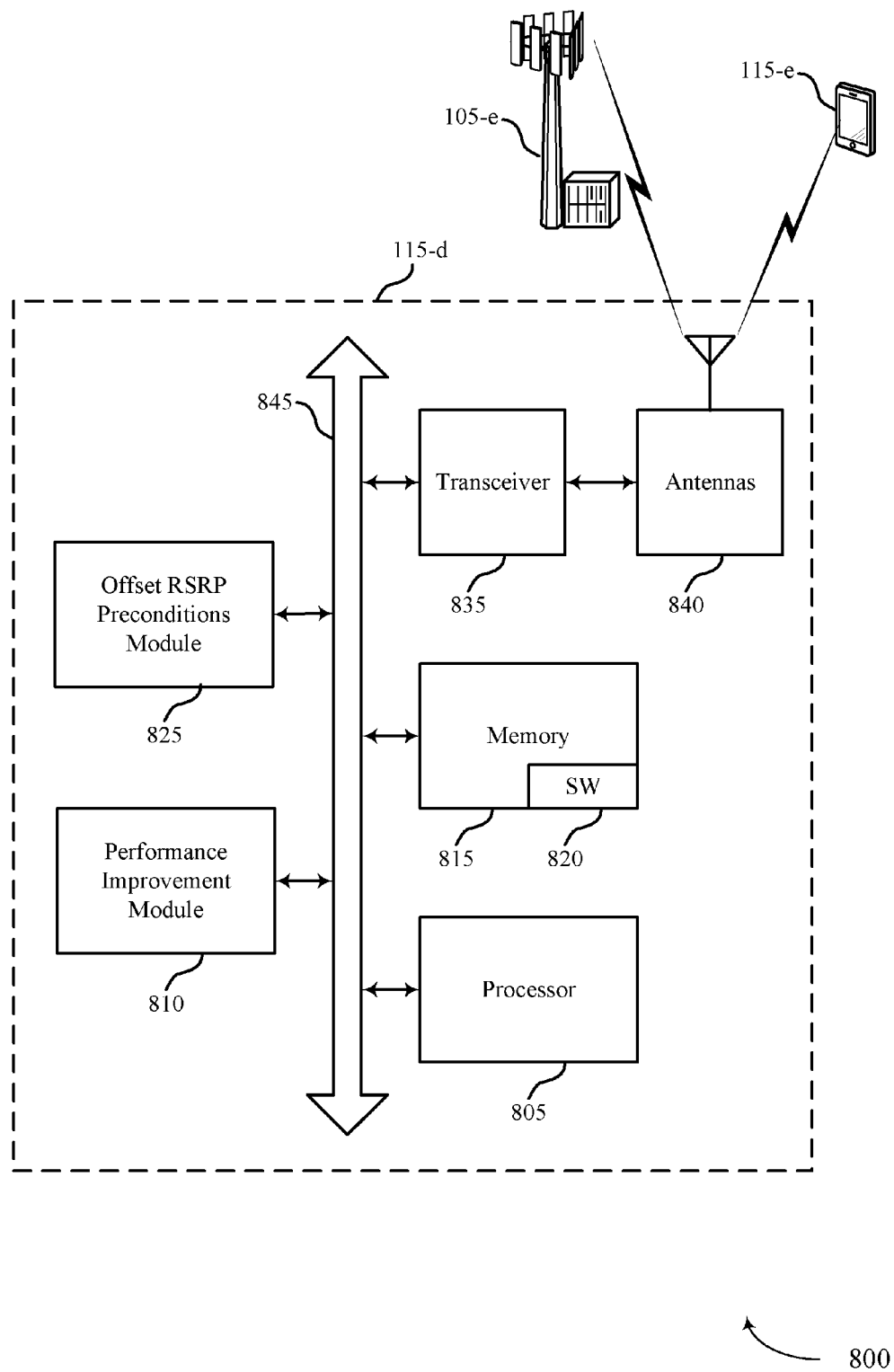
FIG. 8 illustrates a block diagram of a system including a user equipment (UE) that supports performance improvements (e.g., MT performance improvements) for high gain devices in accordance with various aspects of the present disclosure.

FIG. 8 shows a diagram of a system 800 including a UE 115-*d* configured for performance improvements (e.g., MT performance improvements) for high gain devices in accordance with various aspects of the present disclosure. System 800 may include UE 115-*d*, which may be an example of a wireless device 500, a wireless device 600, or a UE 115 described with reference to FIGS. 1-3 and 5-7. UE 115-*d* may include a performance improvement module (e.g., MT performance improvement module) 810, which may be an example of the performance improvement module 510 described with reference to FIGS. 5-7. UE 115-*d* may include an offset RSRP preconditions module 825, which may be an example of the offset RSRP preconditions module 715 described with reference to FIG. 7. UE 115-*d* may include components for bi-directional voice and data communications including components for transmitting communications and components for receiving communications. For example, UE 115-*d* may communicate bi-directionally with UE 115-*e*.

UE 115-*d* may include a processor 805, and memory 815 (e.g., including software (SW)) 820, a transceiver 835, and/or one or more high-gain antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105-*e* or another UE 115-*e*. The transceiver 835 may include a modem to modulate the packets and provide the modulated packets to the antenna(s) 840 for transmission, and to demodulate packets received from the antenna(s) 840. While UE 115-*d* may include a single antenna 840, UE 115-*d* may have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., performance improvements for high gain devices, etc.). Alternatively, the software/firmware code 820 may not be directly executable by the processor 805 but may cause the performance improvement module 810 (e.g., when compiled and executed) to perform the functions described herein. The processor 805 may include an intelligent hardware device, (e.g., a central processing unit (CPU), a microcontroller, an application specific integrated circuit (ASIC), etc.).

The components of wireless device 500, wireless device 600, and performance improvement module 510*b* may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 9:
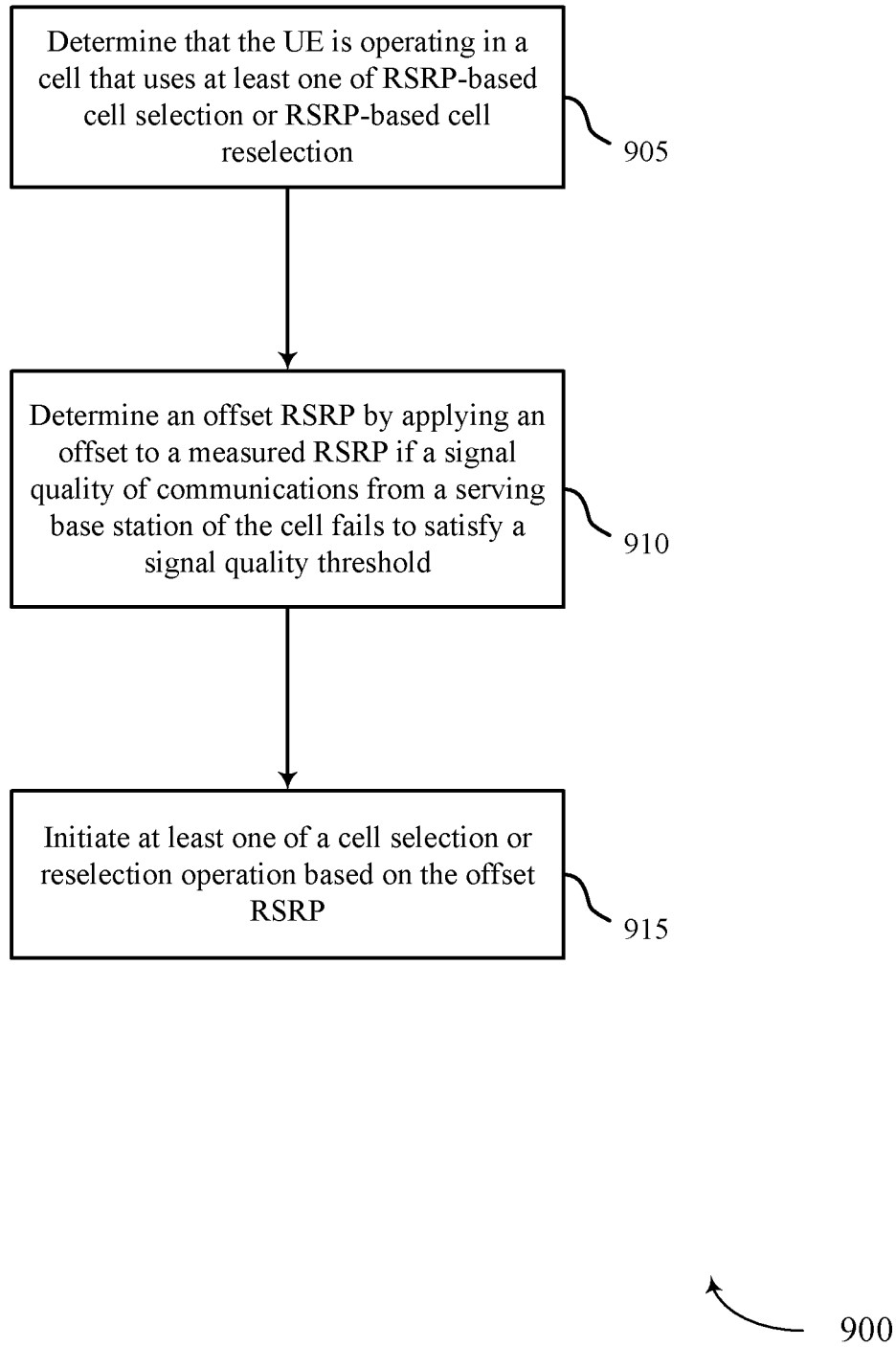
FIGS. 9-11 illustrate methods for performance improvements (e.g., MT performance improvements) for high gain devices in accordance with various aspects of the present disclosure.

FIG. 9 shows a flowchart illustrating a method 900 for performance improvements (e.g., MT performance improvements) for high gain devices in accordance with various aspects of the present disclosure. The operations of method 900 may be implemented by a UE 115 or its components as described with reference to FIGS. 1-8. For example, the operations of method 900 may be performed by the performance improvement module 510 as described with reference to FIGS. 5-8. In some examples, a UE 115 may execute a set of codes to control the functional elements of the UE 115 to perform the functions described below. Additionally or alternatively, the UE 115 may perform aspects of the functions described below using special-purpose hardware.

At block 905, the UE 115 may determine that the UE is operating in a cell that uses at least one of RSRP-based cell selection or RSRP-based cell reselection as described with reference to FIGS. 2-4. In certain examples, the operations of block 905 may be performed by the RSRP-based selection/reselection module 605 as described with reference to FIG. 6.

At block 910, the UE 115 may determine an offset RSRP by applying an offset to a measured RSRP if a signal quality of communications from a serving base station of the cell fails to satisfy a signal quality threshold, as described with reference to FIGS. 2-4. In certain examples, the operations of block 910 may be performed by the offset RSRP module 610 as described with reference to FIG. 6.

At block 915, the UE 115 may initiate at least one of a cell selection or reselection operation based at least in part on the offset RSRP as described with reference to FIGS. 2-4. In certain examples, the operations of block 915 may be performed by the cell selection/reselection module 615 as described with reference to FIG. 6.

Figure 10:
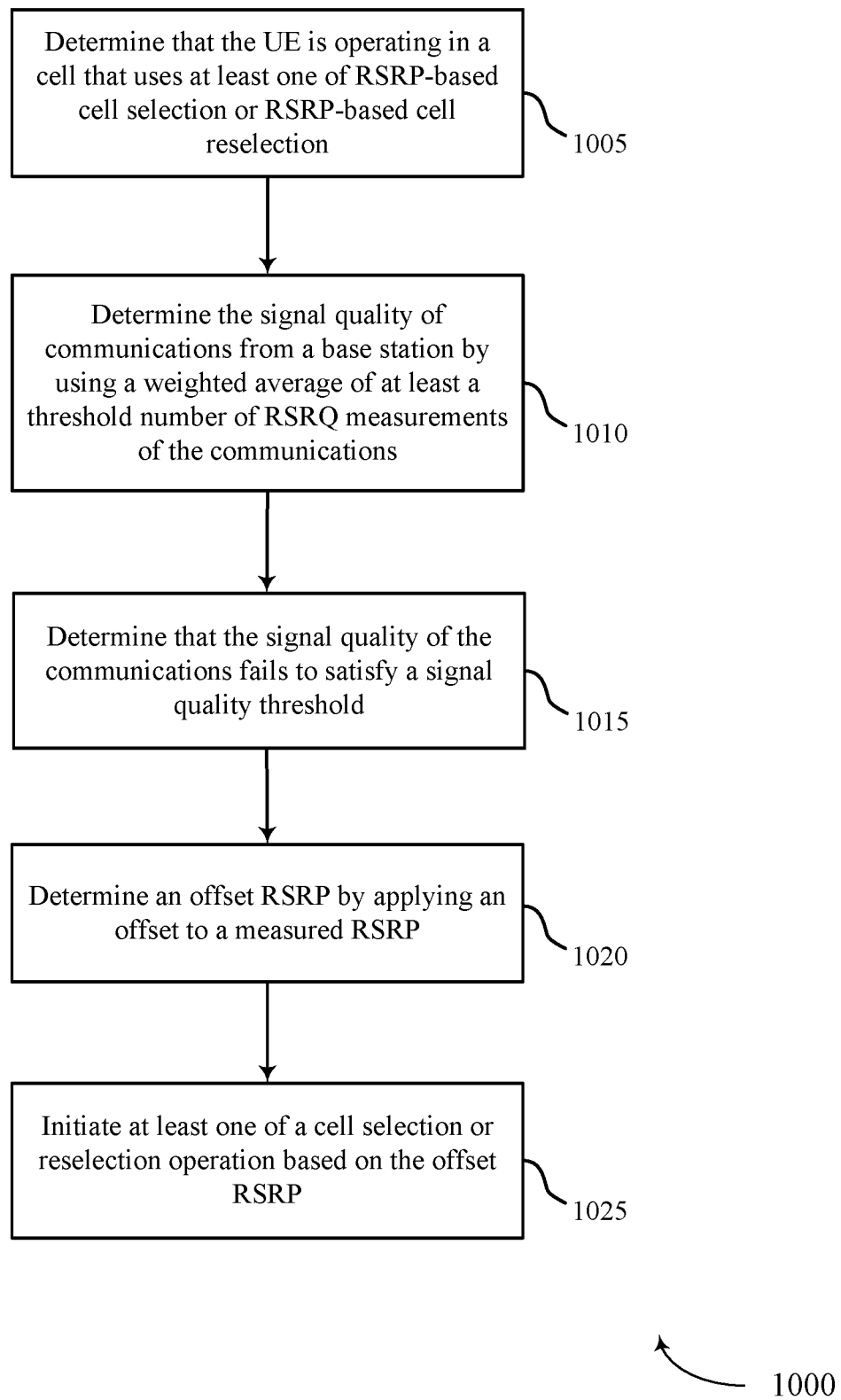

FIG. 10 shows a flowchart illustrating a method 1000 for performance improvements (e.g., MT performance improvements) for high gain devices in accordance with various aspects of the present disclosure. The operations of method 1000 may be implemented by a UE 115 or its components as described with reference to FIGS. 1-8. For example, the operations of method 1000 may be performed by the performance improvement module 510 as described with reference to FIGS. 5-8. In some examples, a UE 115 may execute a set of codes to control the functional elements of the UE 115 to perform the functions described below. Additionally or alternatively, the UE 115 may perform aspects of the functions described below using special-purpose hardware. The method 1000 may also incorporate aspects of method 900 of FIG. 9.

At block 1005, the UE 115 may determine that the UE is operating in a cell that uses at least one of RSRP-based cell selection or RSRP-based cell reselection as described with reference to FIGS. 2-4. In certain examples, the operations of block 1005 may be performed by the RSRP-based selection/reselection module 605 as described with reference to FIG. 6.

At block 1010, the UE 115 may determine the signal quality of communications from a base station by using a weighted average of at least a threshold number of RSRQ measurements of the communications, as described with reference to FIGS. 2-4. In certain examples, the operations of block 1010 may be performed by the signal quality determination module 705 as described with reference to FIG. 7.

At block 1015, the UE 115 may determine that the signal quality of the communications fails to satisfy a signal quality threshold, as described with reference to FIGS. 2-4. In certain examples, the operations of block 1015 may be performed by the offset RSRP module 610 as described with reference to FIG. 6.

At block 1020, the UE 115 may determine an offset RSRP by applying an offset to a measured RSRP as described with reference to FIGS. 2-4. In certain examples, the operations of block 1020 may be performed by the offset RSRP module 610 as described with reference to FIG. 6.

At block 1025, the UE 115 may initiate at least one of a cell selection or reselection operation based at least in part on the offset RSRP as described with reference to FIGS. 2-4. In certain examples, the operations of block 1025 may be performed by the cell selection/reselection module 615 as described with reference to FIG. 6.

Figure 11:
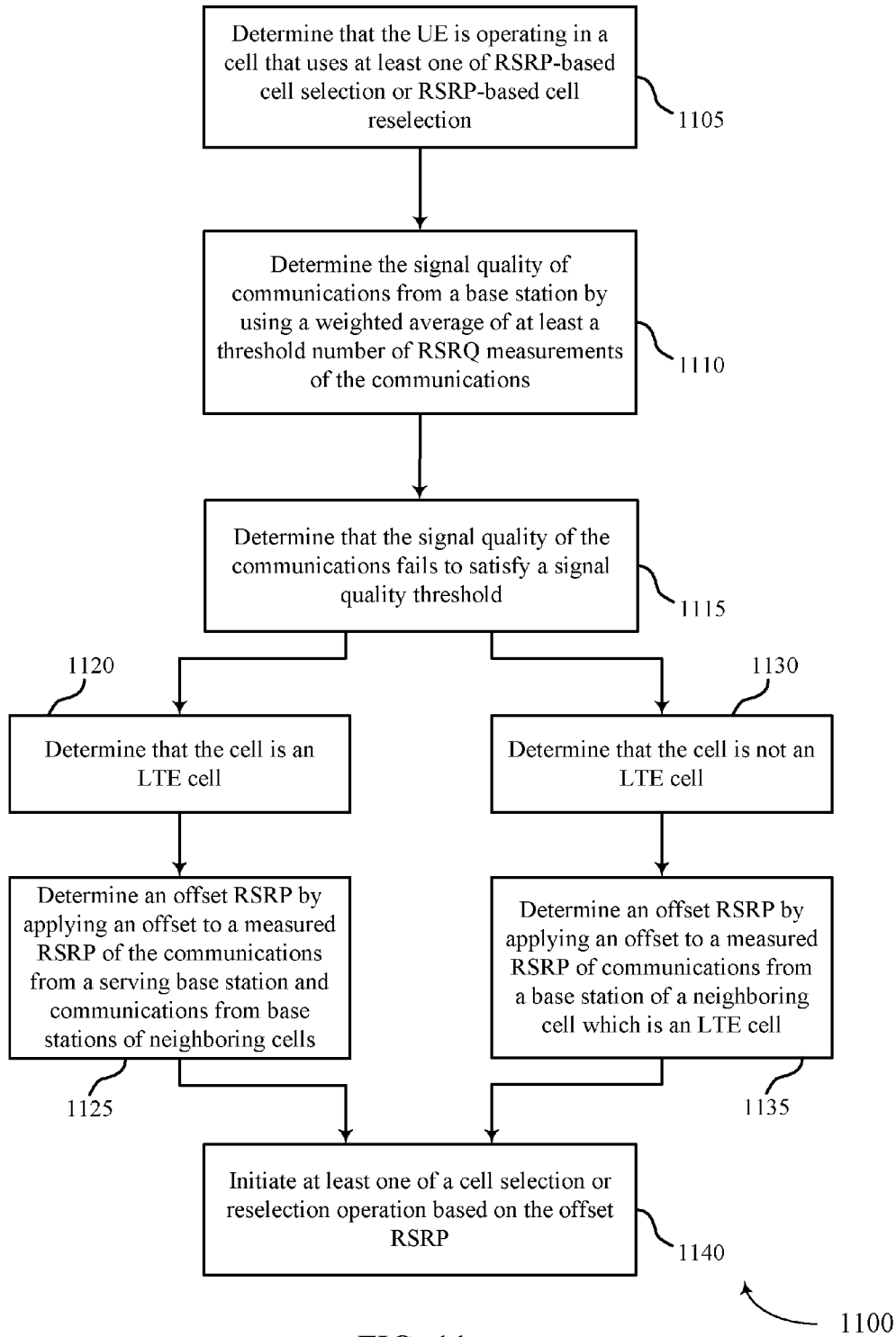

FIG. 11 shows a flowchart illustrating a method 1100 for performance improvements (e.g., MT performance improvements) for high gain devices in accordance with various aspects of the present disclosure. The operations of method 1100 may be implemented by a UE 115 or its components as described with reference to FIGS. 1-8. For example, the operations of method 1100 may be performed by the performance improvement module 510 as described with reference to FIGS. 5-8. In some examples, a UE 115 may execute a set of codes to control the functional elements of the UE 115 to perform the functions described below. Additionally or alternatively, the UE 115 may perform aspects of the functions described below using special-purpose hardware. The method 1100 may incorporate aspects of methods 900, 1000 of FIGS. 9 and 10.

At block 1105, the UE 115 may determine that the UE is operating in a cell that uses at least one of RSRP-based cell selection or reselection as described with reference to FIGS. 2-4. In certain examples, the operations of block 1105 may be performed by the RSRP-based selection/reselection module 605 as described with reference to FIG. 6.

At block 1110, the UE 115 may determine the signal quality of communications from a base station by using a weighted average of at least a threshold number of RSRQ measurements of the communications, as described with reference to FIGS. 2-4. In certain examples, the operations of block 1110 may be performed by the signal quality determination module 705 as described with reference to FIG. 7.

At block 1115, the UE 115 may determine that the signal quality of the communications fails to satisfy a signal quality threshold, as described with reference to FIGS. 2-4. In certain examples, the operations of block 1115 may be performed by the offset RSRP module 610 as described with reference to FIG. 6.

At blocks 1120 and 1130, the UE 115 may determine whether the cell in which the UE 115 is communicating is an LTE cell or a non-LTE cell. At block 1120, the UE 115 may determine that the cell is an LTE cell as described with reference to FIGS. 2-4. In certain examples, the operations of block 1120 may be performed by the offset RSRP module 610 as described with reference to FIG. 6.

At block 1125, the UE 115 may determine an offset RSRP by applying an offset to a measured RSRP of the communications from a serving base station and/or communications from base stations of neighboring cells, as described with reference to FIGS. 2-4. In certain examples, the operations of block 1125 may be performed by the offset RSRP module 610 as described with reference to FIG. 6.

Alternatively, at block 1130, the UE 115 may determine that the cell is not an LTE cell, as described with reference to FIGS. 2-4. In certain examples, the operations of block 1130 may be performed by the offset RSRP module 610 as described with reference to FIG. 6.

At block 1135, the UE 115 may determine an offset RSRP by applying an offset to a measured RSRP of communications from a base station of a neighboring cell which is an LTE cell, as described with reference to FIGS. 2-4. In certain examples, the operations of block 1135 may be performed by the offset RSRP module 610 as described with reference to FIG. 6.

At block 1140, the UE 115 may initiate at least one of a cell selection or reselection operation based at least in part on the offset RSRP as described with reference to FIGS. 2-4. In certain examples, the operations of block 1140 may be performed by the cell selection/reselection module 615 as described with reference to FIG. 6.

Thus, methods 900, 1000, and 1100 may provide for performance improvements (e.g., MT performance improvements) for high gain devices. It should be noted that methods 900, 1000, and 1100 describe possible implementation, and that the operations and the steps may be rearranged or otherwise modified such that other implementations are possible. In some examples, aspects from two or more of the methods 900, 1000, and 1100 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, UTRA, etc. CDMA2000 covers IS-2000, IS-95, and IS-856 standards. IS2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as GSM. An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LIE-advanced (LTE-a) are new releases of Universal Mobile Telecommunications System (UMTS) that use E-UTRA. UTRA, E-UTRA, Universal Mobile Telecommunications System (UMTS), LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication at a user equipment (UE) having a high-gain antenna, comprising:
   determining that the UE is operating in a cell that uses at least one of reference signal received power (RSRP)-based cell selection or RSRP-based cell reselection;
   determining an offset RSRP by applying an offset to a measured RSRP based upon a signal quality of communications from a serving base station of the cell failing to satisfy a signal quality threshold; and
   initiating at least one of a cell selection or reselection operation based at least in part on the offset RSRP.

2. The method of claim 1, further comprising:
   initiating at least one of the cell selection or reselection operation based on a non-offset RSRP based upon the initiating based at least in part on the offset RSRP being unsuccessful.

3. The method of claim 1, further comprising:
   determining the signal quality of the communications by measuring a reference signal received quality (RSRQ) of the communications from the serving base station.

4. The method of claim 1, further comprising:
   determining the signal quality of the communications by using a weighted average of at least a threshold number of reference signal received quality (RSRQ) measurements of the communications from the serving base station.

5. The method of claim 1, further comprising:
determining that the signal quality of the communications is based at least in part on at least a threshold number of reference signal received quality (RSRQ) measurements of the communications from the serving base station before determining that the signal quality of communications from the serving base station of the cell fails to satisfy the signal quality threshold.

6. The method of claim 1, wherein the signal quality threshold is based at least in part on an initial signal quality threshold and a signal quality offset.

7. The method of claim 1, further comprising:
determining that the cell is a Long Term Evolution (LTE) cell; and
applying the offset to the measured RSRP of at least one of the communications from the serving base station or communications from base stations of neighboring cells.

8. The method of claim 1, further comprising:
determining that the cell is not a Long Term Evolution (LTE) cell; and
applying the offset to the measured RSRP of communications from a base station of a neighboring cell which is an LTE cell.

9. The method of claim 1, further comprising:
determining that signal quality-based cell selection or reselection is not enabled in the cell.

10. The method of claim 1, further comprising:
determining that signal quality-based cell selection or reselection is not enabled in neighboring cells.

11. The method of claim 1, wherein the UE is at least a portion of a vehicle.

12. An apparatus for wireless communication at a user equipment (UE) having a high-gain antenna, comprising:
means for determining that the UE is operating in a cell that uses at least one of reference signal received power (RSRP)-based cell selection or RSRP-based cell reselection;
means for determining an offset RSRP by applying an offset to a measured RSRP based upon a signal quality of communications from a serving base station of the cell failing to satisfy a signal quality threshold; and
means for initiating at least one of a cell selection or reselection operation based at least in part on the offset RSRP.

13. An apparatus for wireless communication at a user equipment (UE) having a high-gain antenna, comprising:
a processor;
memory in electronic communication with the processor; and
one or more instructions stored in the memory and operable, when executed by the processor, to cause the apparatus to:
determine that the UE is operating in a cell that uses at least one of reference signal received power (RSRP)-based cell selection or RSRP-based cell reselection;
determine an offset RSRP by applying an offset to a measured RSRP based upon a signal quality of communications from a serving base station of the cell failing to satisfy a signal quality threshold; and
initiate at least one of a cell selection or reselection operation based at least in part on the offset RSRP.

14. The apparatus of claim 13, wherein the one or more instructions are further operable to cause the apparatus to:
initiate at least one of the cell selection or reselection operation based on a non-offset RSRP based upon the initiating based at least in part on the offset RSRP being unsuccessful.

15. The apparatus of claim 13, wherein the one or more instructions are further operable to cause the apparatus to:
determine the signal quality of the communications by measuring a reference signal received quality (RSRQ) of the communications from the serving base station.

16. The apparatus of claim 13, wherein the one or more instructions are further operable to cause the apparatus to:
determine the signal quality of the communications by using a weighted average of at least a threshold number of reference signal received quality (RSRQ) measurements of the communications from the serving base station.

17. The apparatus of claim 13, wherein the one or more instructions are further operable to cause the apparatus to:
determine that the signal quality of the communications is based at least in part on at least a threshold number of reference signal received quality (RSRQ) measurements of the communications from the serving base station before determining that the signal quality of communications from the serving base station of the cell fails to satisfy the signal quality threshold.

18. The apparatus of claim 13, wherein the signal quality threshold is based at least in part on an initial signal quality threshold and a signal quality offset.

19. The apparatus of claim 13, wherein the one or more instructions are further operable to cause the apparatus to:
determine that the cell is a Long Term Evolution (LTE) cell; and
apply the offset to the measured RSRP of at least one of the communications from the serving base station or communications from base stations of neighboring cells.

20. The apparatus of claim 13, wherein the one or more instructions are further operable to cause the apparatus to:
determine that the cell is not a Long Term Evolution (LTE) cell; and
apply the offset to the measured RSRP of communications from a base station of a neighboring cell which is an LTE cell.

21. The apparatus of claim 13, wherein the one or more instructions are further operable to cause the apparatus to:
determine that signal quality-based cell selection or reselection is not enabled in the cell.

22. The apparatus of claim 13, wherein the one or more instructions are further operable to cause the apparatus to:
determine that signal quality-based cell selection or reselection is not enabled in neighboring cells.

23. The apparatus of claim 13, wherein the UE is at least a portion of a vehicle.

24. A non-transitory computer-readable medium storing code for wireless communication at a user equipment (UE) having a high-gain antenna, the code comprising one or more instructions executable to:
determine that the UE is operating in a cell that uses at least one of reference signal received power (RSRP)-based cell selection or RSRP-based cell reselection;
determine an offset RSRP by applying an offset to a measured RSRP based upon a signal quality of communications from a serving base station of the cell failing to satisfy a signal quality threshold; and
initiate at least one of a cell selection or reselection operation based at least in part on the offset RSRP.

25. The non-transitory computer-readable medium of claim 24, wherein the one or more instructions are further executable to:
  initiating at least one of the cell selection or reselection operation based on a non-offset RSRP based upon the initiating based at least in part on the offset RSRP being unsuccessful.

26. The non-transitory computer-readable medium of claim 24, wherein the one or more instructions are further executable to:
  determine the signal quality of the communications by measuring a reference signal received quality (RSRQ) of the communications from the serving base station.

27. The non-transitory computer-readable medium of claim 24, wherein the one or more instructions are further executable to:
  determine the signal quality of the communications by using a weighted average of at least a threshold number of reference signal received quality (RSRQ) measurements of the communications from the serving base station.

28. The non-transitory computer-readable medium of claim 24, wherein the signal quality threshold is based at least in part on an initial signal quality threshold and a signal quality offset.

29. The non-transitory computer-readable medium of claim 24, wherein the one or more instructions are further executable to:
  determine that the cell is a Long Term Evolution (LTE) cell; and
  apply the offset to the measured RSRP of at least one of the communications from the serving base station or communications from base stations of neighboring cells.

30. The non-transitory computer-readable medium of claim 24, wherein the one or more instructions are further executable to:
  determine that the cell is not a Long Term Evolution (LTE) cell; and
  apply the offset to the measured RSRP of communications from a base station of a neighboring cell which is an LTE cell.

* * * * *